United States Patent
Kim et al.

(10) Patent No.: US 11,950,253 B2
(45) Date of Patent: Apr. 2, 2024

(54) METHOD AND APPARATUS FOR TRANSMITTING PDCCH ON BASIS OF DFT-S-OFDM IN WIRELESS COMMUNICATION SYSTEM

(71) Applicant: Samsung Electronics Co., Ltd., Gyeonggi-do (KR)

(72) Inventors: Taehyoung Kim, Gyeonggi-do (KR); Hyoungju Ji, Gyeonggi-do (KR); Juho Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 417 days.

(21) Appl. No.: 17/414,685

(22) PCT Filed: Dec. 17, 2019

(86) PCT No.: PCT/KR2019/017862
§ 371 (c)(1),
(2) Date: Jun. 16, 2021

(87) PCT Pub. No.: WO2020/130562
PCT Pub. Date: Jun. 25, 2020

(65) Prior Publication Data
US 2022/0078765 A1 Mar. 10, 2022

(30) Foreign Application Priority Data
Dec. 21, 2018 (KR) .................. 10-2018-0167901

(51) Int. Cl.
*H04W 72/23* (2023.01)
*H04L 27/26* (2006.01)

(52) U.S. Cl.
CPC ......... *H04W 72/23* (2023.01); *H04L 27/2636* (2013.01)

(58) Field of Classification Search
CPC ........................ H04L 27/2636; H04L 12/28
(Continued)

(56) References Cited

U.S. PATENT DOCUMENTS

2011/0255483 A1 10/2011 Xu et al.
2012/0009923 A1 1/2012 Chen et al.
(Continued)

FOREIGN PATENT DOCUMENTS

KR 1020120112686 10/2012
KR 1020120140684 12/2012
(Continued)

OTHER PUBLICATIONS

Ericsson, "DFT Size for Uplink Transmissions", R1-070461, TSG-RAN WG1 #47bis, Jan. 15-19, 2007, 3 pages.
(Continued)

*Primary Examiner* — Dang T Ton
(74) *Attorney, Agent, or Firm* — The Farrell Law Firm, P.C.

(57) ABSTRACT

In a wireless communication system according to an embodiment, a method of receiving, by a user equipment (UE), physical downlink control channels (PDCCHs) based on discrete Fourier transform spreading orthogonal frequency division multiplexing (DFT-S-OFDM) includes receiving, from a base station (BS), a first PDCCH including first downlink control information (DCI) in which information about a size of DFT precoding applied to a second PDCCH is included; performing blind decoding on the first PDCCH to obtain the first DCI; receiving the second PDCCH including second DCI from the BS; and performing blind decoding on the second PDCCH to obtain the second DCI, based on the information about the size of DFT precoding applied to the second PDCCH included in the first DCI.

10 Claims, 15 Drawing Sheets

(58) Field of Classification Search
USPC .................................. 370/329, 400, 403, 395
See application file for complete search history.

(56) References Cited

U.S. PATENT DOCUMENTS

2012/0314678 A1   12/2012  Ko et al.
2023/0262651 A1*   8/2023  Oh .................... H04W 72/1273
                                                              370/329

FOREIGN PATENT DOCUMENTS

WO    WO 2011/105813    9/2011
WO    WO 2017/222277    12/2017

OTHER PUBLICATIONS

International Search Report dated Apr. 2, 2020 issued in counterpart application No. PCT/KR2019/017862, 17 pages.
Korean Office Action dated Nov. 6, 2023 issued in counterpart application No. 10-2018-0167901, 4 pages.

* cited by examiner

METHOD AND APPARATUS FOR TRANSMITTING PDCCH ON BASIS OF DFT-S-OFDM IN WIRELESS COMMUNICATION SYSTEM

PRIORITY

This application is a National Phase Entry of PCT International Application No. PCT/KR2019/017862 which was filed on Dec. 17, 2019, and claims priority to Korean Patent Application No. 10-2018-0167901, which was filed on Dec. 21, 2018, the entire content of each of which is incorporated herein by reference.

TECHNICAL FIELD

The disclosure relates to a method and apparatus for transmitting PDCCHs in a wireless communication system.

BACKGROUND ART

To meet the ever-increasing demand with respect to wireless data traffic since the commercialization of the 4G communication system, there have been efforts to develop an advanced 5th generation (5G) system or pre-5G communication system. For this reason, the 5G or pre-5G communication system is also called a beyond 4th-generation (4G) network communication system or post long term evolution (LTE) system. Implementation of the 5G communication system using ultrahigh frequency (millimeter wave (mm-Wave)) bands, e.g., 60 giga hertz (GHz) bands, is being considered to attain higher data transfer rates. To reduce propagation loss of radio waves and increase a transmission range of radio waves in the ultrahigh frequency bands, beamforming, massive multiple-input multiple-output (MIMO), full dimensional MIMO (FD-MIMO), array antenna, analog beamforming, and large-scale antenna techniques are under discussion. To improve system networks, technologies for advanced small cells, cloud radio access networks (RANs), ultra-dense networks, device to device (D2D) communication, wireless backhaul, moving networks, cooperative communication, coordinated multi-points (CoMP), reception-end interference cancellation and the like are also being developed in the 5G communication system. In addition, in the 5G system, an advanced coding modulation (ACM), e.g., hybrid FSK and QAM modulation (FQAM), sliding window superposition coding (SWSC), and an advanced access technology, e.g., filter bank multi carrier (FBMC), non-orthogonal multiple access (NOMA), and sparse code multiple access (SCMA) are being developed.

In the meantime, the Internet is evolving from a human-oriented connectivity network where humans generate and consume information to an Internet of things (IoT) network where distributed entities or things send, receive, and process information without human intervention. Internet of Everything (IoE) technologies, in which a big data processing technology through connection with a cloud server, for example, are combined with an IoT technology, have also emerged. To implement IoT, various technologies, such as a sensing technology, a wired/wireless communication and network infrastructure, a service interfacing technology, and a security technology are required, and recently, even technologies for sensor networks, machine to machine (M2M) communication, machine type communication (MTC) for connection between things are being studied. Such an IoT environment may provide intelligent Internet technology (IT) services that create new value to human life by collecting and analyzing data generated from the things connected. IoT may be applied to a variety of areas, such as smart homes, smart buildings, smart cities, smart cars or connected cars, smart grids, health care, smart home appliances and advanced medical services through convergence and combination between existing information technologies (ITs) and various industrial applications.

In this regard, various attempts to apply the 5G communication system to the IoT network are being made. For example, technologies regarding sensor networks, M2M, MTC, etc., are implemented by the 5G communication technologies, such as beamforming, MIMO, array antenna schemes, etc. Even application of a cloud RAN as the aforementioned big data processing technology may be an example of convergence of 5G and IoT technologies.

With the development of the aforementioned technologies and wireless communication systems, various services may be provided, and there is a need for a method for seamlessly providing the services.

DESCRIPTION OF EMBODIMENTS

Technical Problem

Embodiments of the disclosure may provide a method and apparatus for transmitting PDCCHs in a wireless communication system.

Solution to Problem

In a wireless communication system according to an embodiment, a method of receiving, by a user equipment (UE), physical downlink control channels (PDCCHs) based on discrete Fourier transform spreading orthogonal frequency division multiplexing (DFT-S-OFDM) includes receiving, from a base station (BS), a first PDCCH including first downlink control information (DCI) in which information about a size of DFT precoding applied to a second PDCCH is included; performing blind decoding on the first PDCCH to obtain the first DCI; receiving the second PDCCH including second DCI from the BS; and performing blind decoding on the second PDCCH to obtain the second DCI, based on the information about the size of DFT precoding applied to the second PDCCH included in the first DCI.

In a wireless communication system according to an embodiment, a method of transmitting, by a BS, PDCCHs based on DFT-S-OFDM includes transmitting, to a UE, a first PDCCH including first DCI in which information about a size of DFT precoding applied to a second PDCCH is included; and transmitting the second PDCCH including second DCI to the UE.

MODE OF DISCLOSURE

Figure 1:
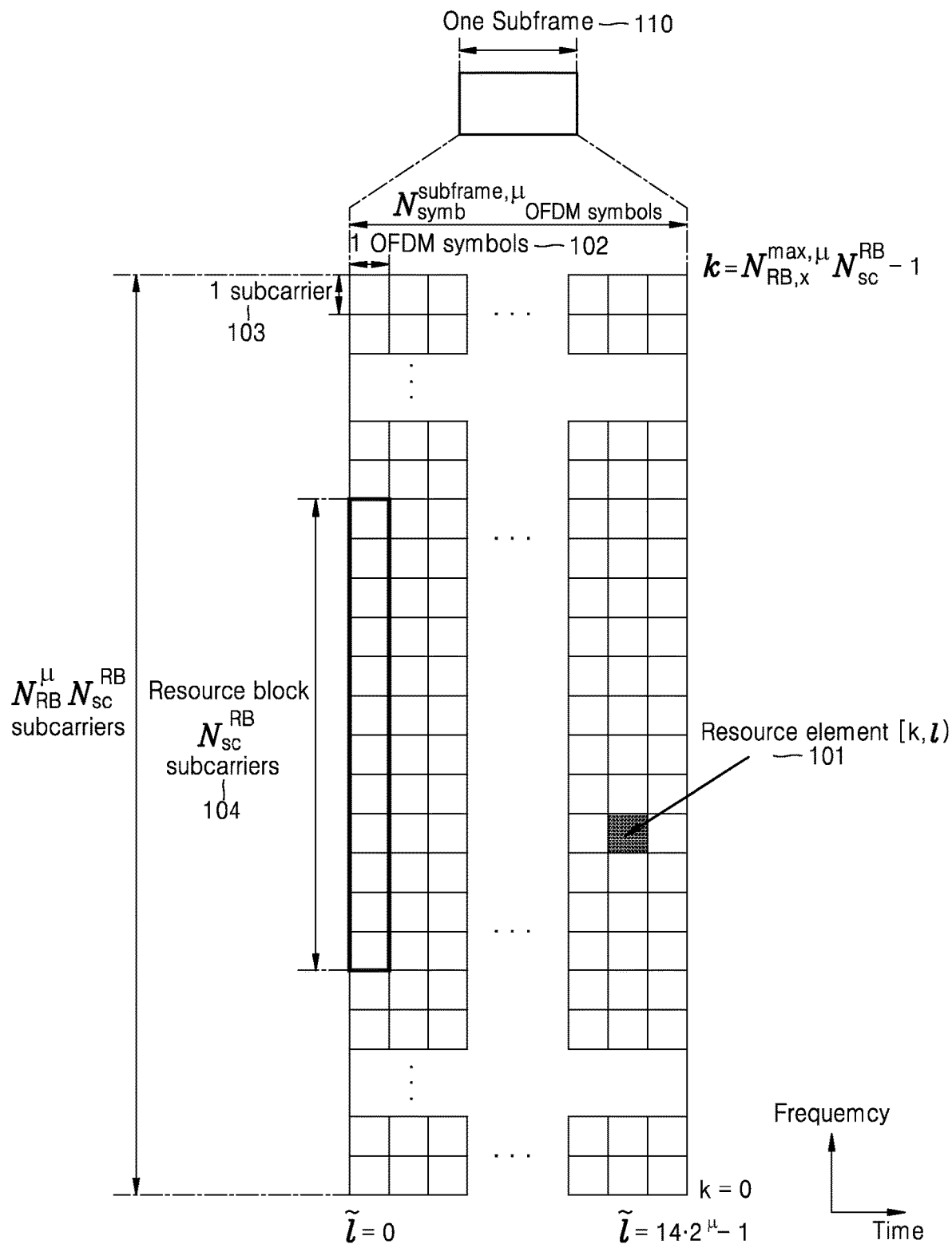
FIG. 1 illustrates a basic structure of a time-frequency domain in a fifth generation (5G) communication system.

Wireless communication systems are evolving from early systems that provide voice-oriented services to broadband wireless communication systems that provide high data rate and high quality packet data services such as third generation partnership project (3GPP) high speed packet access (HSPA), long term evolution (LTE) or evolved universal terrestrial radio access (E-UTRA), LTE-advanced (LTE-A), LTE-Pro, 3GPP2 high rate packet data (HRPD), ultra mobile broadband (UMB), IEEE 802.16e communication standards, and the like.

As a representative example of such a broadband wireless communication system, an LTE system adopts Orthogonal Frequency Division Multiplexing (OFDM) for downlink (DL) and Single Carrier Frequency Division Multiple Access (SC-FDMA) for uplink (UL). The UL refers to a radio link for a user equipment (UE) or mobile station (MS) to transmit data or a control signal to an eNode B or base station (BS), and the DL refers to a radio link for a BS to transmit data or a control signal to a UE or MS. Such a multiple access scheme allocates and operates time-frequency resources for carrying data or control information for respective users not to overlap each other, i.e., to maintain orthogonality, thereby identifying each user's data or control information.

As a future communication system since LTE, the fifth generation (5G) communication system needs to freely reflect various demands from users and service providers and thus support services that simultaneously meet the various demands. The services considered for the 5G communication system may include enhanced Mobile Broadband (eMBB), massive Machine Type Communication (mMTC), Ultra Reliability Low Latency Communication (URLLC), etc.

eMBB aims at providing more enhanced data rates than legacy LTE, LTE-A or LTE-Pro may support. For example, in the 5G communication system, eMBB is required to provide a 20 Gbps peak data rate in a DL and a 10 Gbps peak data rate in a UL in terms of a single BS. Furthermore, the 5G communication system needs to provide an increasing user perceived data rate while providing the peak data rate. To satisfy these requirements, various technologies for transmission or reception including multiple-input multiple-output (MIMO) transmission technologies are required to be more enhanced. While the present LTE uses up to a 20 MHz transmission bandwidth in the 2 GHz band for signal transmission, the 5G communication system may use a frequency bandwidth wider than 20 MHz in the 3 to 6 GHz band or in the 6 GHz or higher band, thereby satisfying the data rate required by the 5G communication system.

At the same time, in the 5G communication system, mMTC is considered to support an application service such as an Internet of Things (IoT) application service. In order for mMTC to provide the IoT efficiently, support for access from a massive number of terminals in a cell, enhanced coverage of the terminal, extended battery time, reduction in terminal price, etc., are required. Because the IoT is equipped in various sensors and devices to provide communication functions, it may be supposed to support a large number of UEs in a cell (e.g., 1,000,000 terminals/$km^2$). Furthermore, a UE supporting mMTC is more likely to be located in a shadow area, such as the underground of a building, which may not be covered by a cell by the nature of the service, and thus, mMTC requires an even larger coverage than expected for other services provided by the 5G communication system. The UE supporting mMTC needs to be a low-cost UE, and requires quite a long battery lifetime such as 10 to 15 years because the battery in the UE is hard to be changed frequently.

Finally, URLLC is a mission critical cellular-based wireless communication service. For example, URLLC may provide services used for remote control over robots or machinery, industrial automation, unmanned aerial vehicles, remote health care, emergency alert, etc. Accordingly, communication offered by URLLC requires very low latency and very high reliability. For example, URLLC services need to satisfy air interface latency to be less than 0.5 millisecond and simultaneously require a packet error rate equal to or lower than 10-5. Hence, for the URLLC services, the 5G system needs to provide a smaller transmit time interval (TTI) than for other services, and simultaneously requires a design that allocates a wide range of resources for a frequency band to secure reliability of the communication link.

Those three services in 5G, eMBB, URLLC, and mMTC may be multiplexed in a single system for transmission. In this case, to meet different requirements for the respective services, different transmission or reception schemes and parameters may be used between the services.

A frame structure in a 5G communication system will now be described in more detail with reference to the accompanying drawings.

FIG. 1 illustrates a basic structure of a time-frequency domain in a 5G communication system.

Referring to FIG. 1, illustrated is a basic structure of the time-frequency domain, which is a radio resource domain where a data or control channel is transmitted in the 5G communication system, and the basic structure of the time-frequency domain has the horizontal axis representing the time domain and the vertical axis representing the frequency domain. A basic resource unit in the time and frequency domain is a resource element (RE) 101, which may be defined as an Orthogonal Frequency Division Multiplexing (OFDM) symbol 102 on the time axis and a subcarrier 103 on the frequency axis. In the frequency domain, $N_{SC}^{RB}$ (e.g., 12) consecutive REs may constitute a single resource block (RB) 104.

Figure 2:
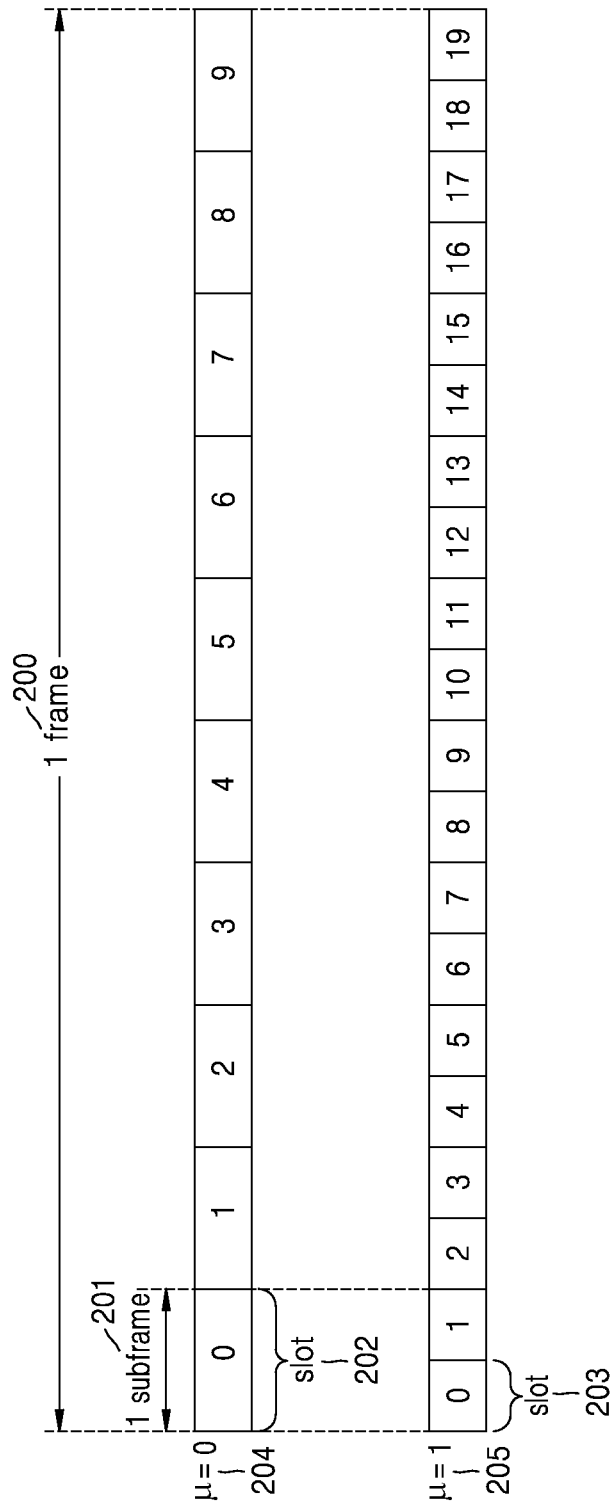
FIG. 2 illustrates a slot structure in a 5G communication system.

FIG. 2 illustrates a slot structure in a 5G communication system.

In FIG. 2, illustrated is an example of frame 200, subframe 201, and slot 202 structures. The one frame 200 may be defined to be 10 ms long. The one subframe 201 may be defined to be 1 ms, and a total of 10 subframes 201 may constitute the one frame 200. The one slot 202 or 203 may be defined to have 14 OFDM symbols (i.e., the number of symbols per 1 slot ($N_{symb}^{slot}$)=14). The one subframe 201 may include one or multiple slots 202 or 203, and the number of slots 202 or 203 per 1 subframe may vary depending on subcarrier spacing configuration values μ 204 and 205. In the example of FIG. 2, the subcarrier spacing configuration values are 0 and 1, i.e., μ=0 (204) and μ=1 (205). In the case of μ=0 (204), the one subframe 201 includes one slot 202, and in the case of μ=1 (205), the one subframe 201 includes two slots 203. That is, depending on the subcarrier spacing configuration value p, the number of slots per 1 subframe ($N_{slot}^{subframe,\mu}$) may vary, and the number of slots per 1 frame ($N_{slot}^{frame,\mu}$) may vary accordingly. $N_{slot}^{subframe,\mu}$ and $N_{slot}^{frame,\mu}$ depending on the subcarrier spacing configuration value p may be defined as in the following Table 1.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Downlink control information (DCI) in the 5G communication system will now be described in detail.

In the 5G communication system, scheduling information for UL data (or a physical uplink shared channel (PUSCH)) or DL data (or a physical downlink shared channel (PDSCH)) is transmitted from the BS to the UE in the DCI. The UE may monitor a fallback DCI format and a non-fallback DCI format for PUSCH or PDSCH. The fallback DCI format may include a fixed field predefined between the BS and the UE, and the non-fallback DCI format may include a configurable field.

The DCI may be transmitted on the physical downlink control channel (PDCCH) after undergoing channel coding and modulation processes. Cyclic redundancy check (CRC) may be appended to a DCI message payload, and the CRC may be scrambled by a radio network temporary identifier (RNTI) that corresponds to the identity of the UE. Depending on the use of the DCI message, e.g., UE-specific data transmission, power control command, random access response, or the like, different RNTIs may be used. In other words, the RNTI may be transmitted not explicitly but in a CRC calculation process. In response to reception of a DCI message transmitted on the PDCCH, the UE may check CRC using an allocated RNTI, and determine that the DCI message is transmitted to the UE when the CRC check result is correct.

For example, DCI that schedules a PDSCH for system information (SI) may be scrambled by an SI-RNTI. DCI that schedules a PDSCH for a random access response (RAR) message may be scrambled by an RA-RNTI. DCI that schedules a PDSCH for a paging message may be scrambled by a P-RNTI. DCI that notifies a slot format indicator (SFI) may be scrambled by an SFI-RNTI. DCI that notifies a transmit power control (TPC) may be scrambled by a TPC-RNTI. DCI that schedules UE-specific PDSCH or PUSCH may be scrambled by a Cell RNTI (C-RNTI).

DCI format 0_0 may be used for the fallback DCI that schedules a PUSCH, in which case the CRC may be scrambled by a C-RNTI. The DCI format 0_0 with the CRC scrambled by a C-RNTI may include information, e.g., in the following Table 2.

TABLE 2

Identifier for DCI formats—[1] bit
Frequency domain resource assignment—[$\lceil \log_2(N_{RB}^{UL,BWP}(N_{RB}^{UL,BWP} + 1)/2) \rceil$]] bits
Time domain resource assignment—4 bits
Frequency hopping flag—1 bit.
Modulation and coding scheme—5 bits
New data indicator—1 bit
Redundancy version—2 bits
HARQ process number—4 bits
TPC command for scheduled PUSCH—[2] bits
UL/SUL indicator—0 or 1 bit DCI format 0_1 may be used for the non-fallback DCI that schedules a PUSCH, in which case the CRC may be scrambled by a C-RNTI. The DCI format 0_1 with the CRC scrambled by a C-RNTI may include information, e.g., in the following Table 3.

TABLE 3

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
    For resource allocation type 0, [$N_{RB}^{UL,BWP}/P$] bits
    For resource allocation type 1, log. ($N_{RB}^{UL,BWP}(N_{RB}^{UL,BWP} +1)/2) \rceil$ bits
Time domain resource assignment - 1, 2, 3, or 4 bits
VRB-to-PRB mapping - 0 or 1 bit, only for resource allocation type 1.
    0 bit if only resource allocation type 0 is configured;
    1 bit otherwise.
Frequency hopping flag - 0 or 1 bit, only for resource allocation type 1.
    0 bit if only resource allocation type 0 is configured;
    1 bit otherwise.
Modulation and coding scheme - 5 bits
New data indicator - 1 bit
Redundancy version - 2 bits
HARQ process number - 4 bits
1st downlink assignment index - 1 or 2 bits
    1 bit for semi-static HARQ-ACK codebook;
    2 bits for dynamic HARQ-ACK codebook with single HARQ-ACK codebook.
2nd downlink assignment index - 0 or 2 bits
    2 bits for dynamic HARQ-ACK codebook with two HARQ-ACK sub-codebooks;
    0 bit otherwise.

TABLE 3-continued

TPC command for scheduled PUSCH - 2 bits

SRS resource indicator—$\left\lceil \log_2\left(\sum_{k=1}^{L_{max}} \binom{N_{SRS}}{k}\right)\right\rceil$ or $\lceil \log_2(N_{SRS})\rceil$ bits $\left\lceil \log_2\left(\sum_{k=1}^{L_{max}} \binom{N_{SRS}}{k}\right)\right\rceil$ bits for non-codebook based PUSCH transmission;
$\lceil \log_2(N_{SRS})\rceil$ bits for codebook based PUSCH transmission.
Precoding information and number of layers - up to 6 bits
Antenna ports - up to 5 bits
SRS request - 2 bits
CSI request - 0, 1, 2, 3, 4, 5, or 6 bits
CBG transmission information - 0, 2, 4, 6, or 8 bits
PTRS-DMRS association - 0 or 2 bits.
beta_offset indicator - 0 or 2 bits
DMRS sequence initialization - 0 or 1 bit DCI format 1_0 may be used for the fallback DCI that schedules a PDSCH, in which case the CRC may be scrambled by a C-RNTI. The DCI format 1_0 with the CRC scrambled by a C-RNTI may include information, e.g., in the following Table 4.

TABLE 4

Identifier for DCI formats—[1] bit
Frequency domain resource assignment—$\lceil \log_2(N_{RB}^{DL,BWP}(N_{RB}^{DL,BWP} + 1)/2)\rceil$ bits
Time domain resource assignment—4 bits
VRB-to-PRB mapping—1 bit.
Modulation and coding scheme—bits
New data indicator—1 bit
Redundancy version—2 bits
HARQ process number—4 bits
Downlink assignment index—2 bits
TPC command for scheduled PUCCH[2] bits
PUCCH resource indicator—3 bits
PDSCH-to-HARQ feedback timing indicator—[3] bits DCI format 1_1 may be used for the non-fallback DCI that schedules a PDSCH, in which case the CRC may be scrambled by a C-RNTI. The DCI format 1_1 with the CRC scrambled by a C-RNTI may include information, e.g., in the following Table 5.

TABLE 5

Carrier indicator—0 or 3 bits
Identifier for DCI formats—[1] bits
Bandwidth part indicator—0, 1 or 2 bits
Frequency domain resource assignment
For resource allocation type 0, $\lceil N_{RB}^{DL,BWP}/P\rceil$ bits
For resource allocation type 1, $\lceil \log_2(N_{RB}^{DL,BWP}(N_{RB}^{DL,BWP} + 1)/2)\rceil$ bits
Time domain resource assignment—1, 2, 3, or 4 bits
VRB-to-PRB mapping—0 or 1 bit, only for resource allocation type 1.
0 bit if only resource allocation type 0 is configured;
1 bit otherwise.
PRB bundling size indicator—0 or 1 bit
Rate matching indicator—0, 1, or 2 bits
ZP CSI-RS trigger—0, 1, or 2 bits
For transport block 1:

Modulation and coding scheme—5 bits
New data indicator—1 bit
Redundancy version—2 bits
For transport block 2:

Modulation and coding scheme—5 bits
New data indicator—1 bit
Redundancy version—2 bits
HARQ process number—4 bits TABLE 5-continued Downlink assignment index—0 or 2 or 4 bits
TPC command for scheduled PUCCH—2 bits
PUCCH resource indicator—3 bits
PDSCH-to-HARQ_feedback timing indicator—3 bits
Antenna ports—4, 5 or 6 bits
Transmission configuration indication—0 or 3 bits
SRS request—2 bits
CBG transmission information—0, 2, 4, 6, or 8 bits
CBG flushing out information—0 or 1 bit
DMRS sequence initialization—1 bit A DL control channel in the 5G communication system will now be described in detail with reference to related drawings.

Figure 3:
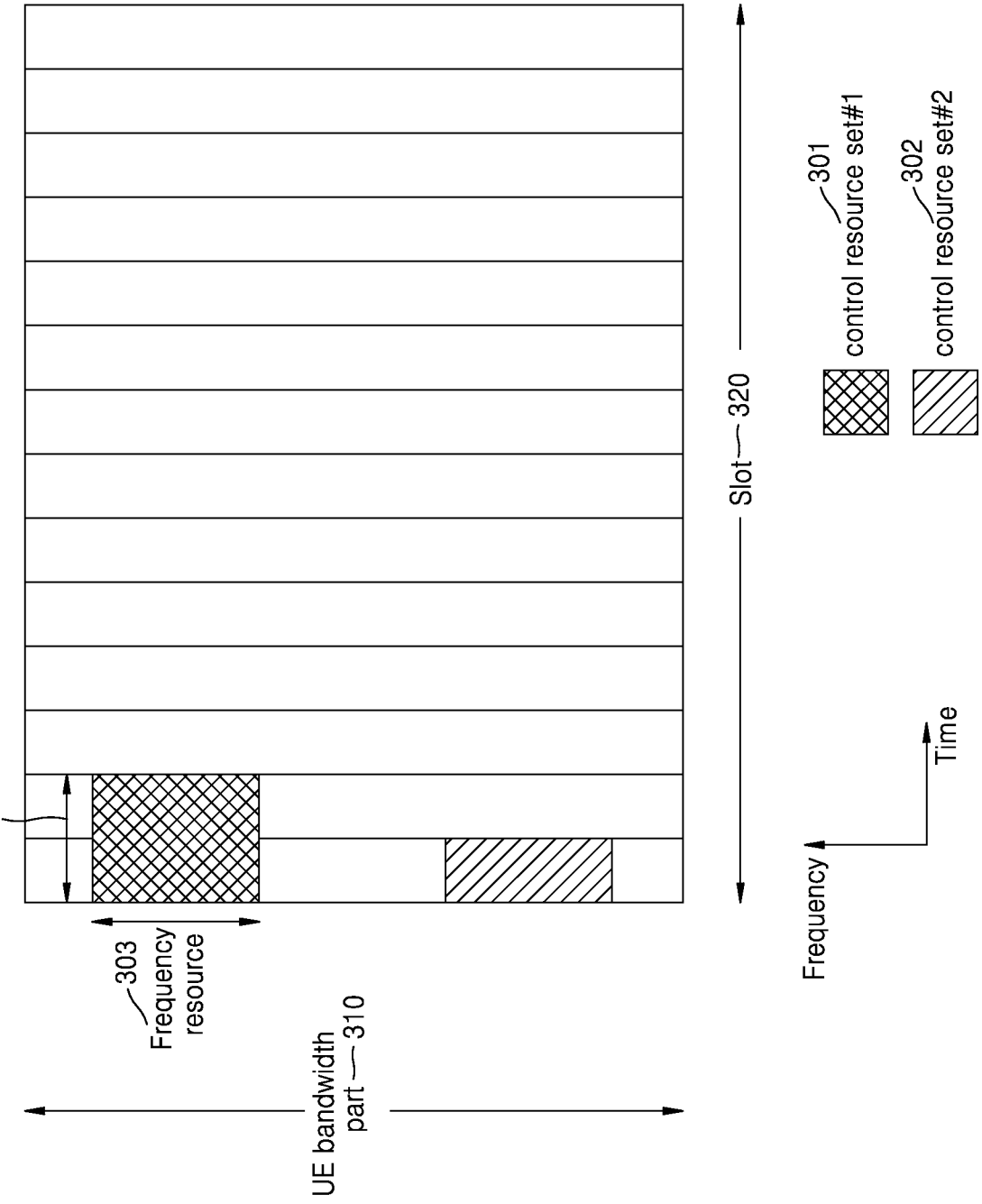
FIG. 3 illustrates an example of configuring control resource sets (CORESETs) for downlink control channels in a 5G communication system.

FIG. 3 illustrates an example of configuring control resource sets (CORESETs) for a downlink control channel in a 5G communication system.

Referring to FIG. 3, illustrated is an example of CORESETs in which DL control channels are transmitted, where two CORESETs, CORESET #1 301 and CORESET #2 302, are configured in a bandwidth part (BWP) 310 on the frequency axis and a slot 320 on the time axis. The CORESETs 301 and 302 may be configured in a particular frequency resource 303 in the entire UE BWP 310 on the frequency axis. One or more OFDM symbols may be configured on the time axis and defined as a CORESET duration 304. In the example of FIG. 3, the CORESET #1 301 is configured to have a CORESET duration of two symbols, and the CORESET #2 302 is configured to have a CORESET duration of one symbol.

As described above, in 5G, the CORESET may be configured by the BS for the UE through higher layer signaling, e.g., SI, a master information block (MIB), or radio resource control (RRC) signaling. Configuring the UE with the CORESET refers to providing the UE with information such as a CORESET ID, a frequency location of the CORESET, a length of symbols of the CORESET, etc. For example, information in the following Table 6 may be included. CHOICE

TABLE 6

ControlResourceSet ::=          SEQUENCE {
-- Corresponds to L1 parameter 'CORESET-ID'
controlResourceSetId            ControlResourceSetId,
frequencyDomainResources        BIT STRING (SIZE
   (45)),
duration                        INTEGER
   (1..maxCoReSetDuration),
cce-REG-MappingType             CHOICE {
   interleaved                  SEQUENCE {
      reg-BundleSize            ENUMERATED {n2, n3,
      n6}, TABLE 6-continued

```
    precoderGranularity              ENUMERATED
    {sameAsREG-bundle, allContiguousRBs},
        interleaverSize              ENUMERATED    {n2,  n3,
n6}
        shiftIndex
        INTEGER (0..maxNrofPhysicalResourceBlocks−1)
                    OPTIONAL
        )
    },
    nonInterleaved                   NULL
},
tci-StatesPDCCH                      SEQUENCE (SIZE
    (1..maxNrofTCI-StatesPDCCH)) OF TCI-StateId
    OPTIONAL,
    tci-PresentInDCI                 ENUMERATED {enabled}
                                     OPTIONAL,   -- Need S
}
```

In Table 6, tci-StatesPDCCH (simply called a TCI state) configuration information may include information about one or more synchronization signal (SS)/physical broadcast channel (PBCH) block indexes having the quasi co-located (QCL) relation with a demodulation reference signal (DMRS) transmitted in the corresponding CORESET or channel state information reference signal (CSI-RS) indexes.

Figure 4:
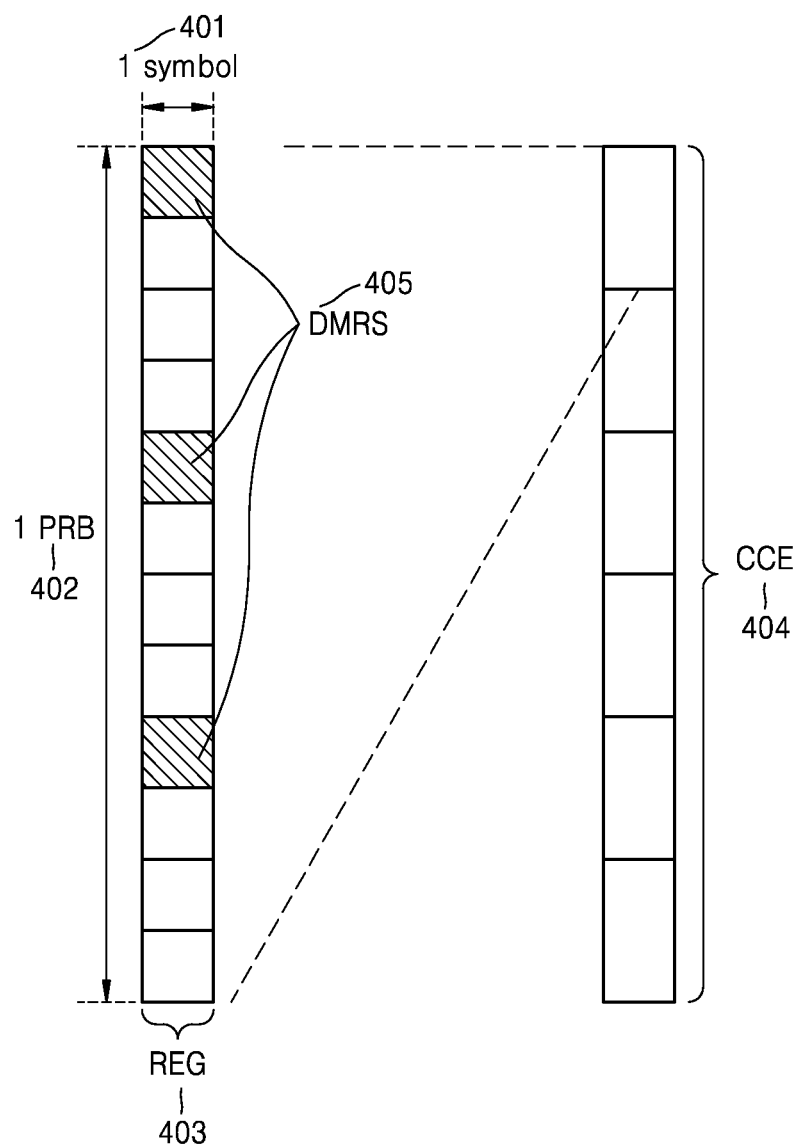
FIG. 4 illustrates an example of a structure of a basic time and frequency resource unit for a downlink control channel in a 5G communication system.

FIG. 4 illustrates an example of a structure of a basic time and frequency resource unit for a DL control channel in a 5G communication system.

Referring to FIG. 4, a basic time and frequency resource unit that forms a control channel is referred to as a resource element group (REG) 403, and the REG 403 may be defined to have one OFDM symbol 401 on the time axis and one physical resource block (PRB) 402, i.e., 12 subcarriers, on the frequency axis. A DL control channel allocation unit may be configured by connecting REGs 403.

As shown in FIG. 4, when a basic unit of allocating the DL control channel is called a control channel element (CCE) 404 in a 5G communication system, the one CCE 404 may be comprised of multiple REGs 403. For example, as shown in FIG. 4, the REG 403 may include 12 REs, and when one CCE 404 includes 6 REGs 403, the one CCE 404 may include 72 REs. When the DL CORESET is configured, it may include multiple CCEs 404, and a particular DL control channel may be transmitted by being mapped to one or more CCEs 404 based on an aggregation level (AL) in the CORESET. The CCEs 404 in the CORESET may be differentiated by numbers, which may be allocated to the CCEs 404 in a logical mapping method.

The basic unit of the DL control channel shown in FIG. 4, i.e., the REG 403, may include both REs to which DCI is mapped, and areas to which DMRSs 405 that are reference signals for decoding the REs are mapped. As shown in FIG. 4, three DMRSs 405 may be transmitted in one REG 403.

The number of CCEs required to transmit the PDCCH may be 1, 2, 4, 8, or 16 depending on the AL, and different numbers of CCEs may be used to implement link adaptation of the DL control channel. For example, when AL=L, a single DL control channel may be transmitted in L CCEs. The UE needs to detect a signal without knowing information about the DL control channel, and search space representing a set of CCEs is defined for the blind decoding. The search space is a set of DL control channel candidates that include CCEs on which the UE needs to try decoding at a given AL, and the UE may have a plurality of search spaces because there are various ALs each making a bundle with 1, 2, 4, 8, or 16 CCEs. A search space set may be defined as a set of search spaces at all the set ALs.

The search spaces may be classified into common search spaces and UE-specific search spaces. A certain group of UEs or all the UEs may check into a common search space of the PDCCH to dynamically schedule the system information or receive cell-common control information, such as a paging message. For example, PDSCH scheduling allocation information for transmitting a system information block (SIB) including cell operator information or the like may be received by checking into the common search space of the PDCCH. For the common search space, a certain group of UEs or all the UEs need to receive the PDCCH, so the common search space may be defined as a set of pre-appointed CCEs. UE-specific PDSCH or PUSCH scheduling allocation information may be received by checking into the UE-specific search space of the PDCCH. The UE-specific search space may be UE-specifically defined as a function of various system parameters and an ID of the UE.

In the 5G communication system, parameters of the search space of the PDCCH may be set by the BS for the UE in higher layer signaling (e.g., SIB, MIB, or RRC signaling). For example, the BS may configure the number of PDCCH candidates at each AL, monitoring periodicity for the search space, monitoring occasion in symbols in the slot for the search space, a type of the search space (common search space or UE-specific search space), a combination of a DCI format to be monitored in the search space and an RNTI, a CORESET index to monitor the search space, etc., for the UE. For example, information in the following Table 7 may be included.

TABLE 7

```
SearchSpace ::=                              SEQUENCE {
    -- Identity of the search space. SearchSpaceId = 0
    identifies the SearchSpace configured via PBCH (MIB) or
    ServingCellConfigCommon.
    searchSpaceId                            SearchSpaceId,
    controlResourceSetId                     ControlResourceSetId,
    monitoringSlotPeriodicityAndOffset                CHOICE {
        sl1                                  NULL,
        sl2                                  INTEGER (0..1),
        sl4                                  INTEGER (0..3),
        sl5                                  INTEGER (0..4),
        sl8                                  INTEGER (0..7),
        sl10                                 INTEGER (0..9),
        sl16                                 INTEGER (0..15),
        sl20                                 INTEGER (0..19)
    }
                                             OPTIONAL,
    duration                                 INTEGER (2..2559)
    monitoringSymbolsWithinSlot                       BIT STRING (SIZE
```

TABLE 7-continued

| | |
|---|---|
| (14)) | OPTIONAL, |
| nrofCandidates | SEQUENCE { |
| aggregationLevel1 | ENUMERATED {n0, n1, n2, n3, n4, n5, n6, n8}, |
| aggregationLevel2 | ENUMERATED {n0, n1, n2, n3, n4, n5, n6, n8}, |
| aggregationLevel4 | ENUMERATED {n0, n1, n2, n3, n4, n5, n6, n8}, |
| aggregationLevel8 | ENUMERATED {n0, n1, n2, n3, n4, n5, n6, n8}, |
| aggregationLevel16 | ENUMERATED {n0, n1, n2, n3, n4, n5, n6, n8} |
| }, | |
| searchSpaceType | CHOICE { |
| -- Configures this search space as common search space (CSS) and DCI formats to monitor. | |
| common | SEQUENCE { |
| } | |
| ue-Specific | SEQUENCE { |
| -- Indicates whether the UE monitors in this USS for DCI formats 0-0 and 1-0 or for formats 0-1 and 1-1. | |
| formats | ENUMERATED { formats0-0-And-1-0, formats0-1-And-1-1}, |
| ... | |
| } | |

Based on the configuration information of Table 7, the BS may configure the UE with one or more search space sets. For example, the BS may configure the UE with search space set 1 and search space set 2, configure the UE to monitor DCI format A scrambled by an X-RNTI in the search space set 1 in the common search space and monitor DCI format B scrambled by a Y-RNTI in the search space set 2 in the UE-specific search space.

The aforementioned configuration information may indicate that there is one or more search space sets in the common or UE-specific search space. For example, search space set #1 and search space set #2 may be configured as the common search space, and search space set #3 and search space set #4 may be configured as the UE-specific search space.

In the common search space, the following combinations of DCI formats and RNTIs may be monitored.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, the following combinations of DCI formats and RNTIs may be monitored.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The enumerated RNTIs may follow the following definitions and uses.

C-RNTI (Cell RNTI): used for UE-specific PDSCH scheduling

TC-RNTI (Temporary Cell RNTI): used for UE-specific PDSCH scheduling

CS-RNTI (Configured Scheduling RNTI): used for semi-statically configured UE-specific PDSCH scheduling RA-RNTI (Random Access RNTI): used for PDSCH scheduling in a random access process P-RNTI (Paging RNTI): used for scheduling a PDSCH on which paging is transmitted SI-RNTI (System Information RNTI): used for scheduling a PDSCH on which system information is transmitted INT-RNTI (Interruption RNTI): used for indicating whether to puncture the PDSCH TPC-PUSCH-RNTI (Transmit Power Control for PUSCH RNTI): used for indicating power control command for a PUSCH TPC-PUCCH-RNTI (Transmit Power Control for PUCCH RNTI): used for indicating power control command for a PUCCH TPC-SRS-RNTI (Transmit Power Control for SRS RNTI): used for indicating power control command for an SRS The specified DCI formats may conform to the following definitions.

TABLE 8

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In the 5G communication system, with CORESET p and search space set s, a search space at aggregation level L may be expressed as in the following equation.

$$L \cdot \left\{ \left( Y_{p,n_{s,t}^\mu} + \left\lfloor \frac{m_{s,n_{CI}} \cdot N_{CCE,p}}{L \cdot M_{p,s,max}^{(L)}} \right\rfloor + n_{CI} \right) \bmod \lfloor N_{CCE,p}/L \rfloor \right\} + i \quad \text{[Equation 1]}$$

L: aggregation level $n_{CI}$: carrier index $N_{CCE,p}$: a total number of CCEs present in the CORESET p $n_{s,f}^\mu$: slot index $M_{p,s,max}^{(L)}$: the number of PDCCH candidates at aggregation level L $m_{s,n_{Ci}}=0, \ldots, M_{p,s,max}^{(L)}-1$: PDCCH candidate index at aggregation level L i=0, ..., L−1

$Y_{p,n_{s,f}^\mu}=(A_p \cdot Y_{n,s_{s,f}^\mu-1})\mod D$, $Y_{p,-1}=n_{RNRI}\neq 0$, $A_0=39827$, $A_1=39829$, $A_2=39839$, $D=65537$ $n_{RNTI}$: UE identifier Value of $Y_{p,n_{s,f}^\mu}$ may correspond to 0 for common search space.

Value of $Y_{p,n_{s,f}^\mu}$ may correspond to a value that changes according to a UE Identity (C-RNTI or ID configured by the BS for the UE) and the time index for the UE-specific search space.

A discrete Fourier transform spreading orthogonal frequency division multiplexing (DFT-S-OFDM) based transmitting method according to some embodiments of the disclosure will now be described with reference to the drawings.

Figure 5:
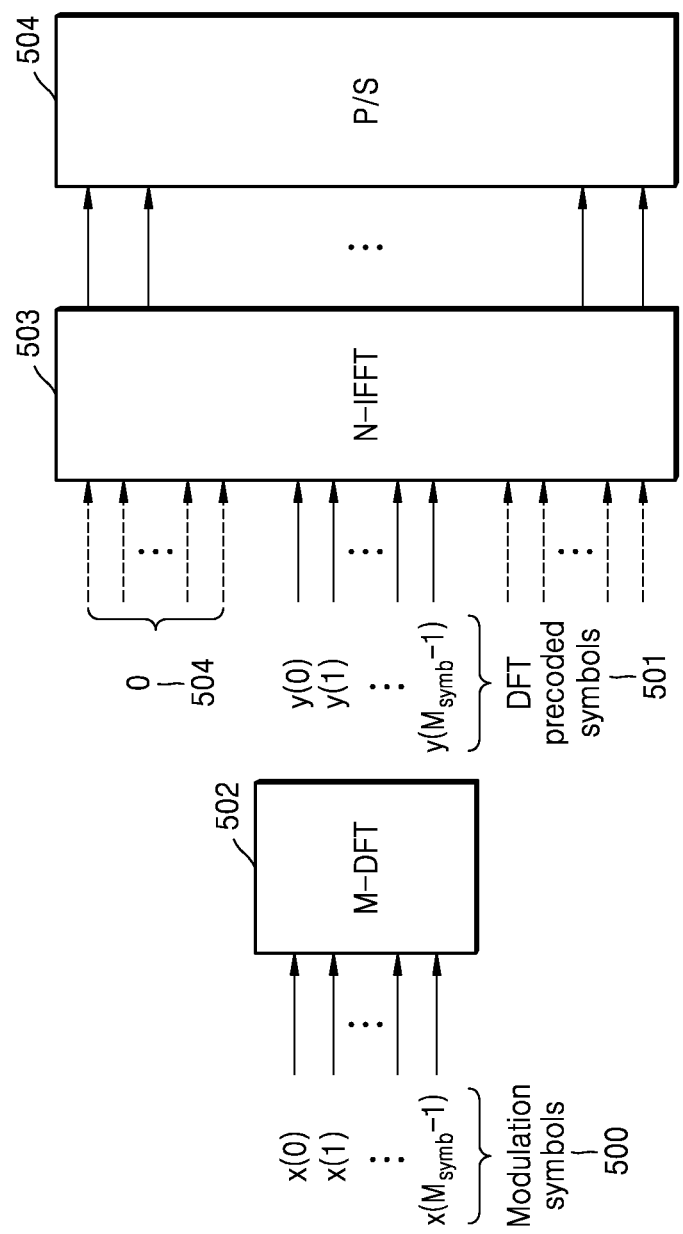
FIG. 5 illustrates an example of a localized DFT-S-OFDM based transmission scheme, according to an embodiment.
Figure 6:
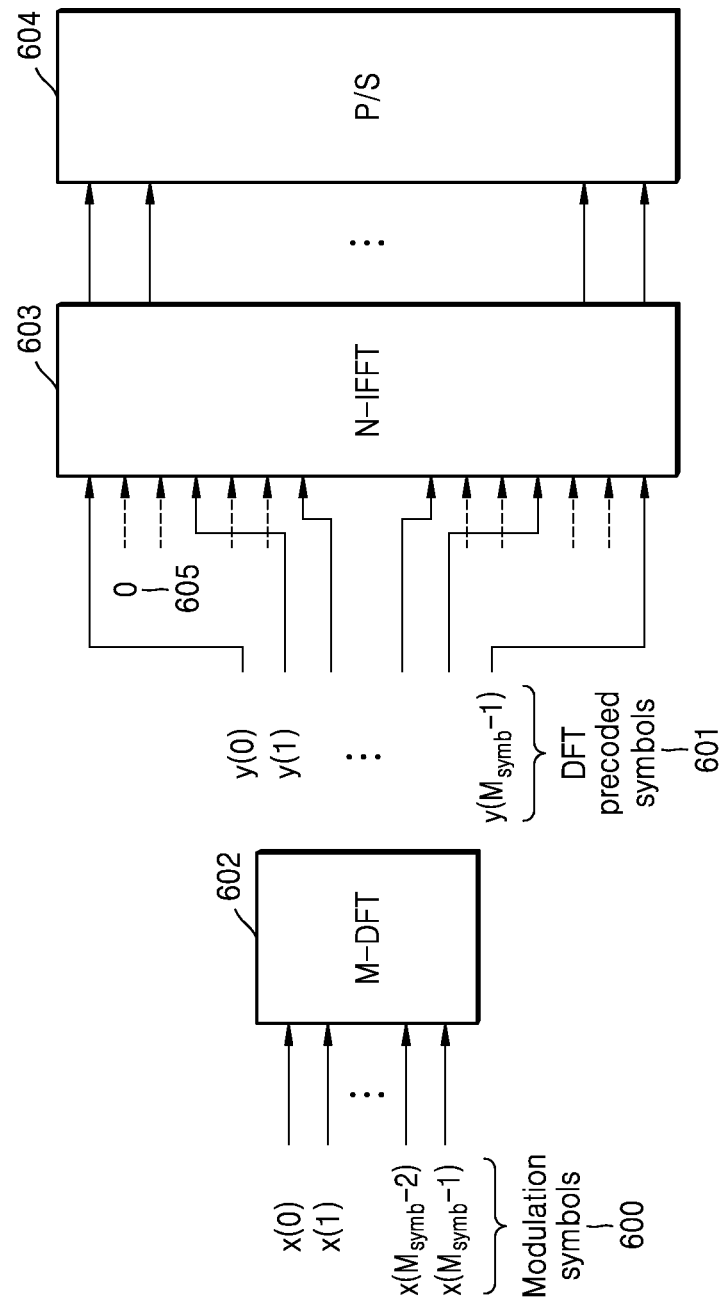
FIG. 6 illustrates an example of a distributed DFT-S-OFDM based transmission scheme, according to an embodiment.

FIGS. 5 and 6 illustrate an example of a DFT-S-OFDM based transmission scheme, according to an embodiment.

A total of $M_{symb}$ modulation symbols 500 or 600, x(0), x(1), ..., $x(M_{symb}-1)$ are subject to M-sized DFT precoding (502 or 602), and a total of M DFT precoded symbols 501 or 601, y(0), y(1), ..., $y(M_{symb}-1)$ may be output. In this case, x and y may be expressed in the following equation.

$$y(k) = \frac{1}{\sqrt{M}} \sum_{i=0}^{M-1} x(i)e^{-j\frac{2\pi i k}{M}}, \text{ where } k = 0, \ldots, M-1 \quad \text{[Equation 2]}$$

The M DFT precoded symbols 501 or 601 may be mapped to some or all of a total of N subcarriers, and then transformed to time domain symbols through an N-sized inverse fast Fourier transform (IFFT) 503 or 603. In this case, when M≤N, remaining areas left over after data mapping are filled with 0's (504 or 604)

Depending on how to map the DFT precoded symbols in the frequency domain, there may be localized transmission schemes and distributed transmission schemes.

FIG. 5 illustrates an example of a localized DFT-S-OFDM based transmission scheme, according to an embodiment.

In an embodiment, the DFT precoded symbol 501 may be successively mapped in the frequency domain. For example, a total of M DFT precoded symbols 501, y(0), y(1), ..., y(M−1) may be successively mapped to subcarrier indexes k, k+1, k+2, ..., k+M−1.

FIG. 6 illustrates an example of a distributed DFT-S-OFDM based transmission scheme, according to an embodiment.

In an embodiment, the DFT precoded symbols 601 may be successively mapped in a distributed fashion at regular intervals in the frequency domain. Specifically, a total of M DFT precoded symbols 601, y(0), y(1), ..., y(M−1) may be mapped to subcarrier indexes k, k+1·D, k+2·D, ..., k+(M−1)·D among a total of N subcarriers. In this case, it may be determined that D=N/M.

Figure 7:
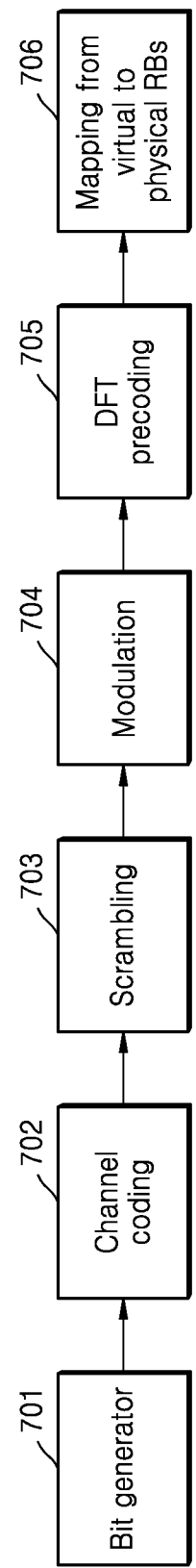
FIG. 7 illustrates a DFT-S-OFDM based transmission method, according to an embodiment.

FIG. 7 illustrates a DFT-S-OFDM based transmission method, according to an embodiment.

First, data bits to be transmitted may be generated in 701. The data bits may be subject to channel coding in 702 by being entered as an input value to a channel coder. A total of $M_{bit}$-bit bit sequence (b(0), b(1), ..., $b(M_{bit}-1)$) output from the channel coding may be scrambled in 703. Output values b'(0), b'(1), ..., $b'(M_{bit}-1)$ after the scrambling may be determined as follows:

$$b'(i)=\{b(i)+c(i)\}\text{modulo } 2, i=0, 1, \ldots, M_{bit}-1$$

c(i) may be defined as a scrambling sequence. X modulo Y may correspond to a modulo operator that outputs a remainder of a division of X by Y. The bit sequence b' that underwent scrambling in 703 may undergo modulation in 704 to be output as $M_{sym}$ modulated symbol sequence (d(0), d(1), ..., $d(M_{sym}-1)$). The 5G communication system supports a modulation scheme based on modulation orders of the following Table 9.

TABLE 9

| Transform precoding disabled | | Transform precoding enabled | |
| --- | --- | --- | --- |
| Modulation scheme | Modulation order $Q_m$ | Modulation scheme | Modulation order $Q_m$ |
| QPSK | 2 | π/2-BPSK | 1 |
| 16QAM | 4 | QPSK | 2 |
| 64QAM | 6 | 16QAM | 4 |
| 256QAM | 8 | 64QAM | 6 |
| | | 256QAM | 8 |

The modulated symbol sequence d(0), d(1), ..., $d(M_{sym}-1)$ is subject to DFT precoding in 705 and output as a precoded symbol sequence y(0), y(1), ..., $y(M_{sym}-1)$. y and d have the following relation according to Equation 3:

$$y(k) = \frac{1}{\sqrt{M_{sym}}} \sum_{i=0}^{M_{sym}-1} d(i)e^{-j\frac{2\pi i k}{M}}, \quad \text{[Equation 3]}$$

where $k = 0, \ldots, M_{sym} - 1$

The DFT precoded symbol sequence y(0), y(1), ..., $y(M_{sym}-1)$ may be mapped to physical resources, i.e., time and frequency domain resources, in 706. The symbols mapped to the physical resources may be modulated into OFDM symbols by undergoing an IFFT, and then transmitted.

Wireless communication in an ultrahigh frequency band equal to or higher than 52.6 GHz is challenging to secure sufficient coverage because of significant path attenuation. Hence, it may be an alternative to perform communication using DFT-S-OFDM with very low peak-to-average power ratio (PAPR) characteristics. Accordingly, a DFT-S-OFDM based physical layer channel design may be required.

In the disclosure, a DFT-S-OFDM based PDCCH transmission and reception method and apparatus is proposed. A BS may be able to transmit PDCCHs of multiple UEs by multiplexing them before DFT precoding, so the size of a DFT precoder may be changeable according to a PDCCH to be actually multiplexed. In this case, the UE may perform blind decoding on the PDCCH without information about its DFT size, which may significantly increase the complexity of the UE. To solve this, in an embodiment of the disclosure, the BS may notify the UE of a DFT size on a first PDCCH, and the UE may perform blind decoding on a second PDCCH based on the notified DFT size. In this case, a search space of the second PDCCH may be defined in a resource domain corresponding to the notified DFT size.

Embodiments of the disclosure will now be described in conjunction with accompanying drawings. Although the following embodiments will focus on the 5G communication system as an example, they may be equally applied to other communication systems with similar technical backgrounds or channel types. For example, they may be applied to LTE or LTE-A mobile communication and future mobile communication technologies beyond 5G. Accordingly, embodiments of the disclosure will be equally applied to other communication systems through some modifications to an extent that does not significantly deviate from the scope of the disclosure when judged by those of ordinary skill in the art.

In the description of the disclosure, when it is determined that a detailed description of related functions or configurations may unnecessarily obscure the subject matter of the disclosure, the detailed description will be omitted. Further, the terms, as will be mentioned later, are defined by taking functionalities in the disclosure into account, but may vary depending on practices or intentions of users or operators. Accordingly, the terms should be defined based on descriptions throughout this specification.

First Embodiment

Figure 8:
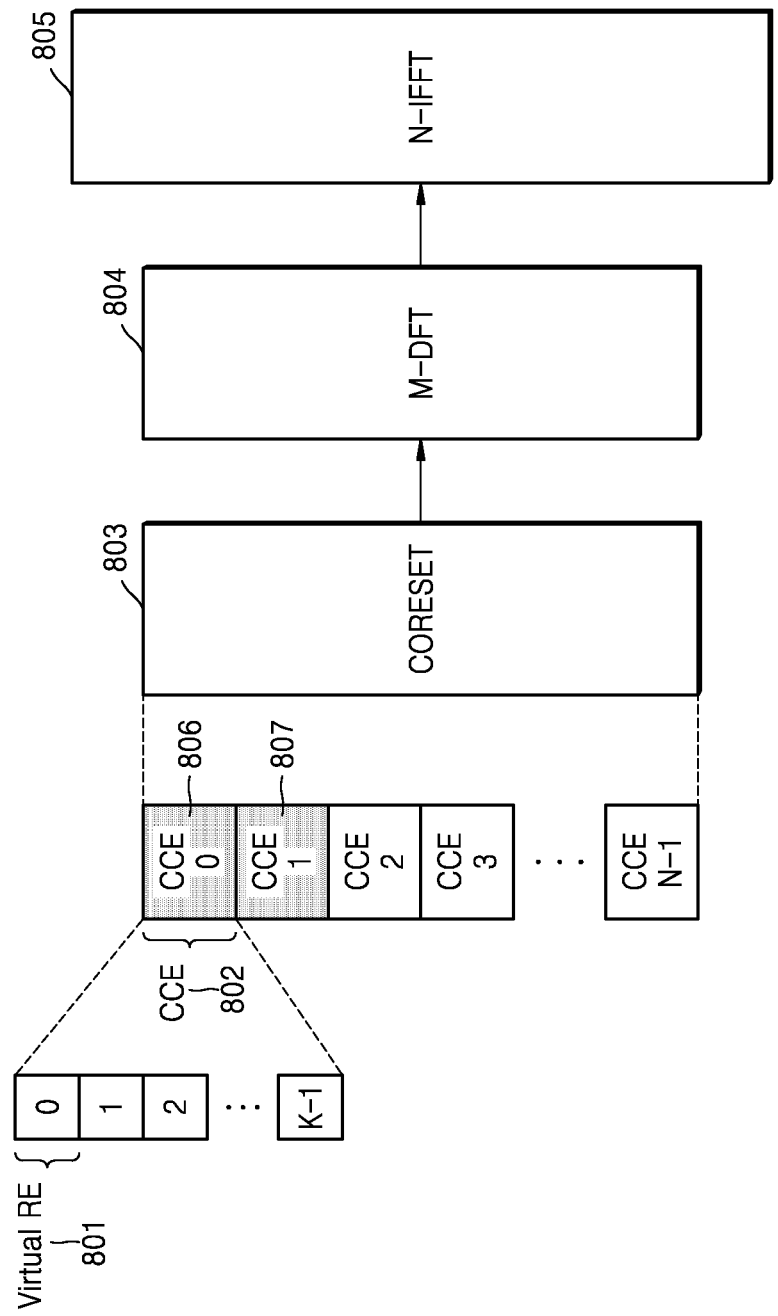
FIG. 8 illustrates a method of transmitting PDCCHs based on DFT-S-OFDM, according to a first embodiment of the disclosure.

FIG. 8 illustrates a method of transmitting PDCCHs based on DFT-S-OFDM, according to a first embodiment of the disclosure. In the first embodiment of the disclosure, a CCE, which is a basic transmission unit of PDCCH, and a search space may be defined in a virtual resource (RE) domain. Furthermore, the size of a DFT precoder to be applied to PDCCH modulation symbols for transmission may be larger than the number of PDCCH modulation symbols for transmission. For example, the size of the DFT precoder may be determined by the size of the CORESET.

FIG. 8 illustrates a method of transmitting PDCCHs based on DFT-S-OFDM, according to a first embodiment of the disclosure.

In an embodiment, for a DFT-S-OFDM based PDCCH, CCEs, a search space, and a CORESET may be defined in virtual resources before DFT precoding.

In an embodiment, a virtual RE 801 may be defined as a smallest unit for allocation of resources to which symbols may be mapped before DFT precoding, and a modulation symbol may be mapped to a virtual RE and transmitted. In other words, $M_{symb}$ modulation symbols may be transmitted in $M_{sym}$ virtual REs.

In an embodiment, a basic PDCCH allocation unit, a CCE 802 may be comprised of K (≥1) virtual REs 801. K, for example, may be defined to be a multiple of the number of REs corresponding to 1 RB, i.e., a multiple of 12, which is 36, 48, 60, or the like. CCEs 802 may be connected and transmitted as a single PDCCH. For example, when AL=L (L=1, 2, 4, 8 or 16), a PDCCH may be transmitted in L CCEs.

In an embodiment, a CORESET 803 may be defined to be a full set of CCEs 802. A search space may be defined to be a set of PDCCH candidates of the CCEs 802 that comprise the CORESET 803, to which a PDCCH may be mapped (see Equation 1).

The BS may notify the UE of CORESET configuration information including at least one of the following parameters by higher layer signaling (e.g., MIB, SIB, or RRC signaling, etc.).

CORESET identity
the number of virtual resources (REs) (or a total number of CCEs that comprise the CORESET, or a DFT size)
the number of symbols
DMRS QCL related configuration information In an embodiment, a PDCCH modulation symbol may be mapped to one of the PDCCH candidates defined as a search space, and may then be subject to the m-sized DFT precoding in 804. In this case, the size M of the DFT precoder 804 may be equal to the total number of virtual REs configured for the CORESET 803. For example, when a CCE is comprised of K virtual REs, and a CORESET corresponding to a total of N CCEs is configured, the size M of the DFT precoder 804 may be equal to K·N. In other words, the size of the DFT precoder required to transmit a PDCCH may be implicitly determined from a size of the configured CORESET. As a result, the size of the DFT precoder may always be constant regardless of the number of PDCCH modulation symbols for transmission (this may refer to the number of virtual REs required to transmit the PDCCH or the number of CCEs required to transmit the PDCCH).

In an embodiment, after the PDCCH is mapped to a CCE0 806 and a CCE1 807, the DFT precoder 804 of the M (=N·K) size equal to the size of the CORESET 803 may be applied. Output symbols after application of the DFT precoder 804 may be mapped to physical resources, i.e., time and frequency domain resources (in 707 of FIG. 7). The symbols mapped to the physical resources may be modulated into OFDM symbols by undergoing the IFFT 805, and then transmitted.

Figure 9:
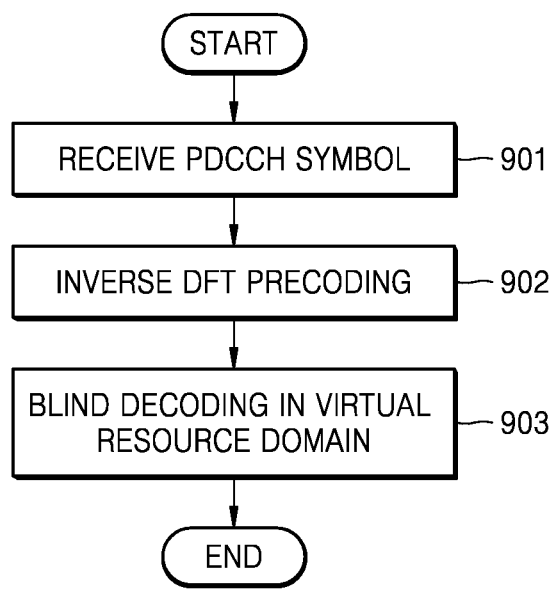
FIG. 9 illustrates operations of a user equipment (UE), according to the first embodiment of the disclosure.

FIG. 9 illustrates operations of a UE, according to the first embodiment of the disclosure.

In operation 901, the UE may receive PDCCH symbols modulated by DFT-S-OFDM.

In operation 902, the UE may apply a series of processes (e.g., IFFT, channel estimation, channel equalization, etc.) and then inverse DFT precoding to the received PDCCH symbols. The inverse DFT precoding may refer to an inverse operation (i.e., a process of extracting x from y) of the DFT precoding defined in the aforementioned equation 2.

In operation 903, the UE may perform blind decoding in the virtual resource domain. The blind decoding in the operation 903 may include operations such as symbol demodulation, channel decoding, etc.

With the DFT-S-OFDM based PDCCH transmission method according to the first embodiment of the disclosure, the UE may perform the inverse DFT precoding operation on the assumption that the size of the DFT precoder is a known parameter (e.g., a size of a CORESET), and perform blind decoding on the PDCCH. In other words, the UE may perform blind decoding on the PDCCH without a blind search for the size of the DFT precoder, thereby diminishing the complexity from PDCCH blind decoding.

Second Embodiment

In the second embodiment of the disclosure, a method of transmitting PDCCHs based on DFT-S-OFDM is proposed. In the second embodiment of the disclosure, a CCE, which is a basic transmission unit of PDCCH, and a search space may be defined in the physical resource domain before precoding, i.e., time and frequency resources. The size of a DFT precoder to be applied to PDCCH modulation symbols for transmission may be determined based on the number of PDCCH modulation symbols for transmission.

Figure 10:
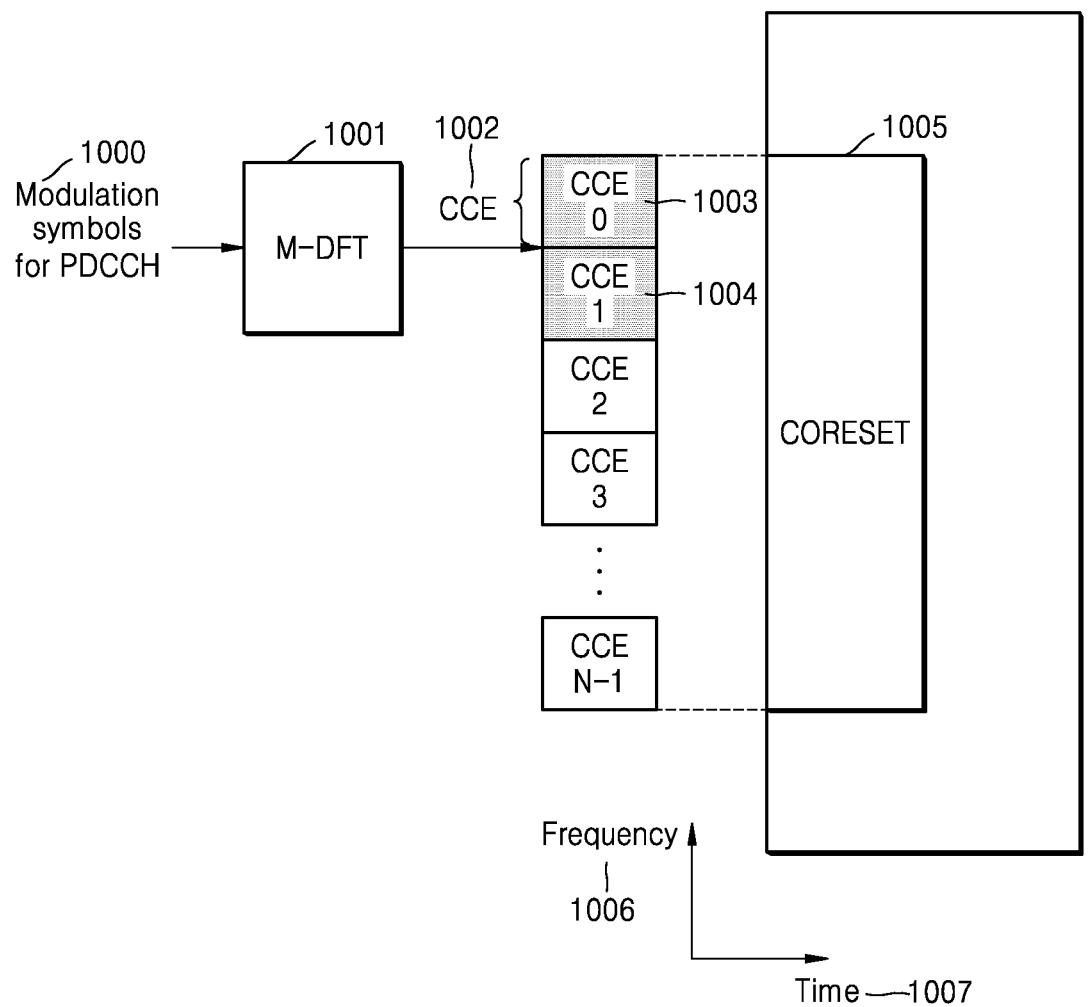
FIG. 10 illustrates a method of transmitting PDCCHs based on DFT-S-OFDM, according to a second embodiment of the disclosure.

FIG. 10 illustrates a method of transmitting PDCCHs based on DFT-S-OFDM, according to the second embodiment of the disclosure.

In an embodiment, for a DFT-S-OFDM based PDCCH, CCEs, a search space, and a CORESET may be defined on physical resources after DFT precoding.

In an embodiment, a CORESET 1005 may be defined by certain resources in time 1007 and frequency 1006. The BS may notify the UE of CORESET configuration information including at least one of the following parameters by higher layer signaling (e.g., MIB, SIB, or RRC signaling, etc.).

CORESET identity
frequency domain resource allocation information
time domain resource allocation information
DMRS QCL related configuration information In an embodiment, the CORESET 1005 may be comprised of N (≥1) CCEs 1002, and a CCE may be comprised of K (≤1) REs. K, for example, may be defined to be a multiple of the number of REs corresponding to 1 RB, i.e., a multiple of 12, which is 36, 48, 60, or the like. CCEs 1002 may be connected and transmitted as a single PDCCH. For example, when AL=L (L=1, 2, 4, 8 or 16), a PDCCH may be transmitted in L CCEs. A search space may be defined as a set of PDCCH candidates of the CCEs 1002 that comprise the CORESET 1005, to which a PDCCH may be mapped (see the equation 1).

In an embodiment, the modulation symbols for PDCCH 1000 may be subject to DFT precoding 1001. In this case, the size M of the DFT precoder 1001 may be equal to the number of modulation symbols for PDCCH 1000 for transmission. For example, for $M_{sym}$ modulation symbols for PDCCH, $M_{sym}$-sized DFT precoding may be applied. The number $M_{sym}$ of modulation symbols for PDCCH may be determined by the number of CCEs in which to transmit the PDCCH, i.e., the aggregation level L. For example, when a CCE is comprised of K REs and a PDCCH is transmitted at AL=L, L CCEs is used, so $M_{sym}$=L·K. As a result, the size of the DFT precoder 1001 may be implicitly determined from the aggregation level L.

In an embodiment, modulation symbols after DFT precoding 1001 may be mapped to a PDCCH candidate in a set of PDCCH candidates defined as the search space, and transmitted. For example, for transmission at AL=2, it may be mapped to CCE0 1003 and CCE1 1004 and transmitted.

With the DFT-S-OFDM based PDCCH transmission method according to the second embodiment of the disclosure, the BS may transmit symbols with relatively very low PAPR values. This may relatively widen the PDCCH transmission coverage. On the other hand, because the UE may have not determined what aggregation level was used by the BS to transmit the PDCCH, in the process of performing blind decoding on the PDCCH, the UE needs to perform blind detection for the size of the DFT precoder. For example, when the UE performs blind decoding on a certain PDCCH candidate of aggregation level L, the UE may perform the blind decoding after inverse DFT precoding on the assumption that the size M of the DFT precoder is LK. In other words, whenever blind decoding is performed at each aggregation level, the blind decoding may be performed by assuming a different size of the DFT precoder. This may increase blind decoding complexity of the UE.

Figure 11:
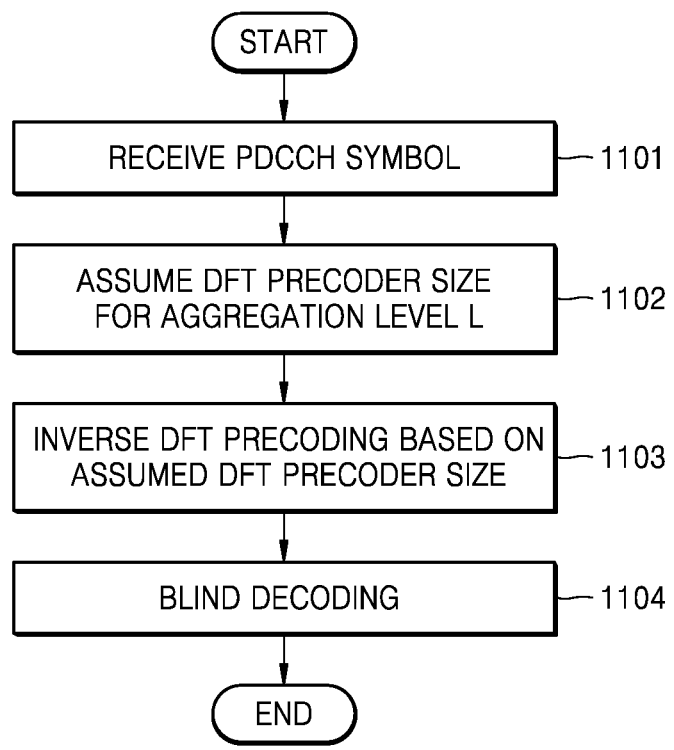
FIG. 11 illustrates operations of a UE, according to the second embodiment of the disclosure.

FIG. 11 illustrates operations of a UE, according to the second embodiment of the disclosure.

In operation 1101, the UE may receive PDCCH symbols modulated by DFT-S-OFDM.

In operation 1102, the UE may determine a size of the DFT precoder to be applied for the aggregation level L to perform blind decoding for a search space of the aggregation level L. For example, when a CCE is comprised of K REs, the UE may assume that the size M of the DFT precoder is M=K·L.

In operation 1103, the UE may apply a series of processes (e.g., IFFT, channel estimation, channel equalization, etc.), and then inverse DFT precoding equal to the size of the DFT precoder assumed in operation 1102.

In operation 1104, the UE may perform blind decoding. The blind decoding performed by the UE may include operations such as symbol demodulation, channel decoding, etc. The UE having performed the blind decoding for the aggregation level L may perform blind decoding for another aggregation level L' in the same method. The UE may perform blind decoding for its search space at every set aggregation level.

Third Embodiment

In the third embodiment of the disclosure, a method of transmitting PDCCHs based on DFT-S-OFDM is proposed. In the third embodiment of the disclosure, PDCCHs may include a first PDCCH in which to transmit first DCI and a second PDCCH in which to transmit a second DCI. The first DCI transmitted in the first PDCCH may include at least an indicator for the size of the DFT precoder for the second PDCCH. The UE may perform blind decoding on the second PDCCH by assuming the size of the DFT precoder notified from the first DCI.

Figure 12:
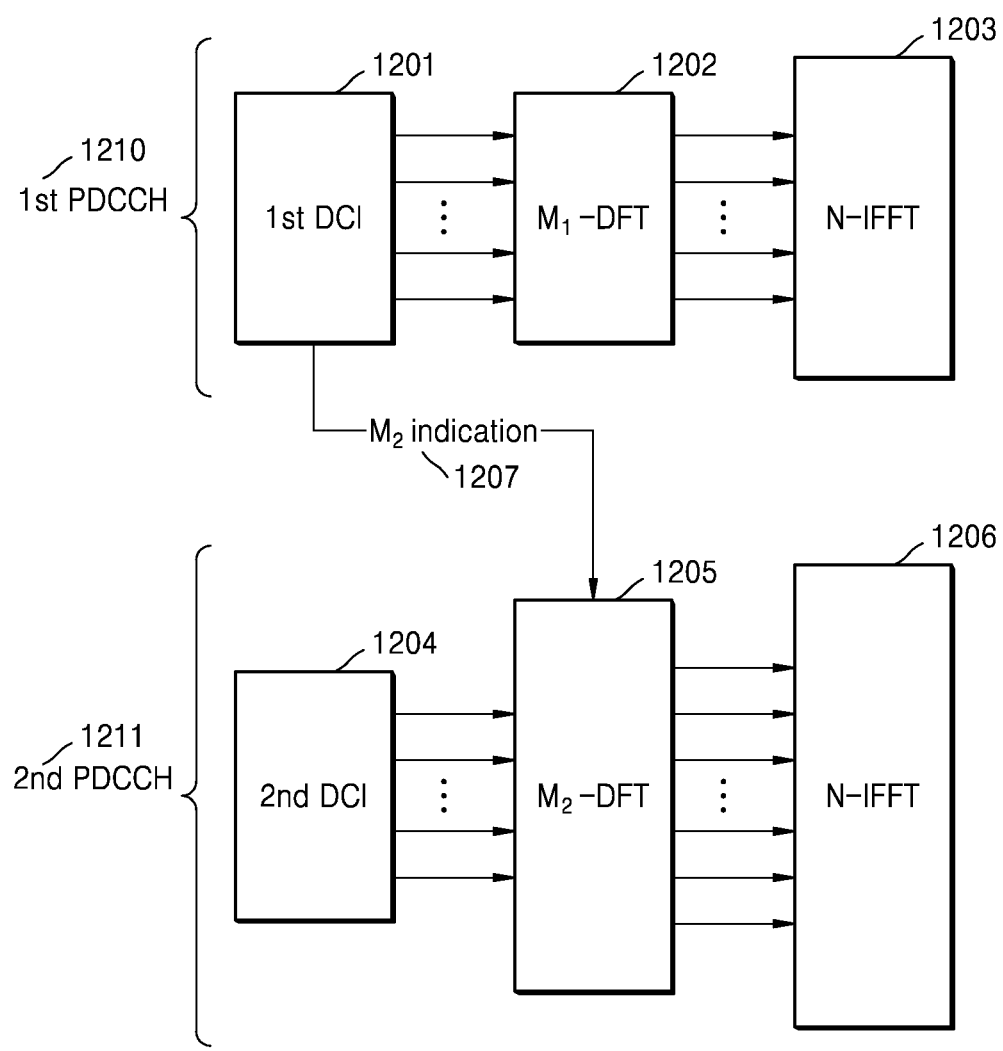
FIG. 12 illustrates a method of transmitting PDCCHs based on DFT-S-OFDM, according to a third embodiment of the disclosure.

FIG. 12 illustrates a method of transmitting PDCCHs based on DFT-S-OFDM, according to the third embodiment of the disclosure.

In an embodiment, first DCI 1201 may be transmitted in a first PDCCH 1201. The first DCI 1201 may include common or group-common control information for multiple UEs. CRC of the first DCI 1201 may be scrambled by a common or group-common RNTI. A search space of the first PDCCH 1201 may be defined as a common search space. The first PDCCH 1201 may be fixedly transmitted in certain time or frequency domain resources. The first PDCCH 1201 may be transmitted in a localized DFT-S-OFDM (corresponding to FIG. 5) or distributed DFT-S-OFDM (corresponding to FIG. 6) based transmission method.

In an embodiment, a bit sequence of the first DCI 1201 may be subject to DFT precoding 1202 after undergoing channel coding, scrambling, and modulation (see the DFT-S-OFDM transmission method of FIG. 7). In this case, $M_1$-sized DFT precoding 1202 may be applied. The UE may be statically or semi-statically configured or notified from the BS of the value of the size $M_1$ of the DFT precoder 1202 applied to the first PDCCH 1210. Specifically, the size $M_1$ of the DFT precoder 1202 may be determined in at least one of the following methods.

Method 1

The value of the size $M_1$ of the DFT precoder applied to the first PDCCH 1210 may be defined by being fixed to a certain value.

Method 2

The value of the size $M_1$ of the DFT precoder applied to the first PDCCH 1210 may be implicitly determined with various system parameters. For example, the value of the size $M_1$ of the DFT precoder may be implicitly determined with a system parameter such as system bandwidth, configured BWP bandwidth, subcarrier spacing, etc.

Method 3

The BS may notify the UE of the value of the size $M_1$ of the DFT precoder applied to the first PDCCH 1210 in higher layer signaling (e.g., MIB, SIB, RRC signaling).

Method 4

The BS may configure the UE with a CORESET of a virtual resource domain for the first PDCCH 1210, and the value of the size $M_1$ of the DFT precoder may be implicitly determined from the size of the configured CORESET (equally, the total number of virtual REs included in the CORESET, or the total number of CCEs included in the CORESET) (see the first embodiment of the disclosure). For example, when a CCE is comprised of K virtual REs, and a CORESET corresponding to a total of N CCEs is configured, the size $M_1$ of the DFT precoder may be equal to KN.

In an embodiment, output symbols after application of the DFT precoder 1202 may be mapped to physical resources, i.e., time and frequency domain resources (in 707 of FIG. 7), and then modulated into OFDM symbols through an IFFT 1203 and transmitted.

In an embodiment, when the UE performs blind decoding on the first PDCCH 1210, the UE may perform blind decoding by assuming the notified size $M_1$ of the DFT precoder. Specifically, in performing blind decoding on the first PDCCH 1210, the UE may perform blind decoding based on the notified configuration information about the size of the DFT precoder without performing extra blind detection for the size of the DFT precoder.

In an embodiment, the first DCI 1201 transmitted in the first PDCCH 1210 may include control information required to perform blind decoding on a second PDCCH 1211. For example, the first DCI 1201 may include an indicator for a value of size $M_2$ of the DFT precoder applied to the second PDCCH 1211.

In an embodiment, a second DCI 1204 may be transmitted in the second PDCCH 1211. The second DCI 1204 may correspond to UE-specific control information for a certain UE. The second DCI 1204 may be scrambled by a UE-specific RNTI (e.g., a C-RNTI, or a UE ID). A search space of the second PDCCH 1211 may be defined as a UE-specific search space. The first PDCCH 1201 may be transmitted in a localized DFT-S-OFDM based transmission scheme (corresponding to FIG. 5).

In an embodiment, a bit sequence of the second DCI 1204 may be subject to DFT precoding 1205 after undergoing channel coding, scrambling, and modulation (see the DFT-S-OFDM based transmission method of FIG. 7). In this case, M2-sized DFT precoding 1205 may be applied. The UE may be dynamically notified of the value of the size $M_2$ of the DFT precoder 1205 applied to the second PDCCH 1211 from the BS by L1 signaling or by a combination of L1 signaling and higher layer signaling (MIB, SIB, or RRC). Specifically, the size $M_2$ of the DFT precoder 1205 may be determined in at least one of the following methods.

[Method 5]

The value of the size $M_2$ of the DFT precoder 1205 applied to the second PDCCH 1211 may be indicated in the first DCI 1201 transmitted in the first PDCCH 1210.

[Method 6]

The BS may configure the UE with a set of a total of X candidates of the value of the size $M_2$ of the DFT precoder 1205 applied to the second PDCCH 1211 in higher layer signaling (e.g., MIB, SIB, RRC, etc.). The BS may indicate at least one of the X $M_2$ values configured by higher layer signaling to the UE in the first DCI 1201 transmitted in the first PDCCH 1210.

In an embodiment, output symbols after application of the DFT precoder 1205 may be mapped to physical resources, i.e., time and frequency domain resources (in 707 of FIG. 7), and then modulated into OFDM symbols through an IFFT 1206 and transmitted.

In an embodiment, when the UE performs blind decoding on the second PDCCH 1211, the UE may perform blind decoding by assuming the size $M_2$ of the DFT precoder notified in the first PDCCH 1210. Specifically, in performing blind decoding on the second PDCCH 1211, the UE may perform blind decoding based on the notified configuration information about the size of the DFT precoder without performing extra blind detection for the size of the DFT precoder.

Figure 13:
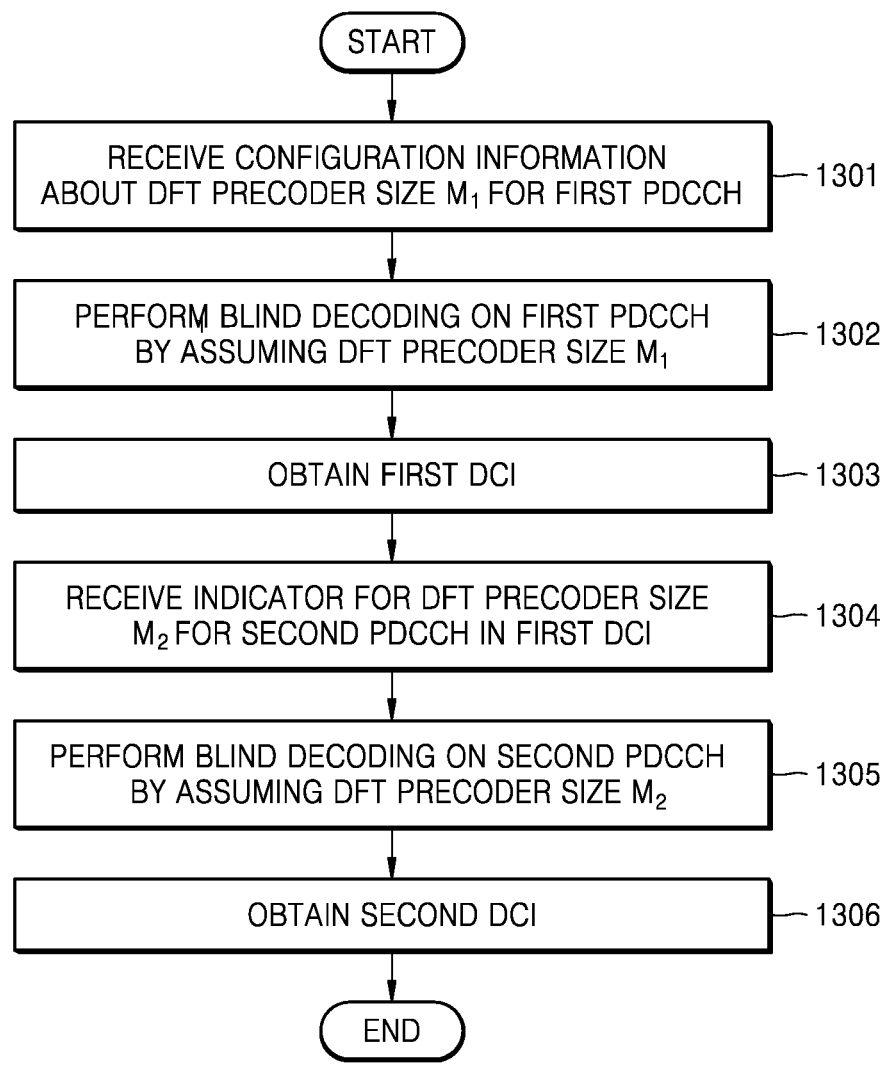
FIG. 13 illustrates operations of a UE, according to the third embodiment of the disclosure.

FIG. 13 illustrates operations of a UE, according to the third embodiment of the disclosure.

In operation 1301, the UE may receive configuration information about the size $M_1$ of a DFT precoder for a first PDCCH (see methods 1, 2, 3, and 4 in the aforementioned description in connection with FIG. 11).

In operation 1302, the UE may assume the size of the DFT precoder to be $M_1$, and perform blind decoding on the first PDCCH.

In operation 1303, the UE may obtain first DCI from the first PDCCH.

In operation 1304, the UE may be notified of a value of a size $M_2$ of a DFT precoder for a second PDCCH in the first DCI obtained in operation 1303 (see methods 5 and 6 of the aforementioned description in connection with FIG. 11).

In operation 1305, the UE may assume the size $M_2$ of the DFT precoder notified in the first PDCCH to be the size of the DFT precoder, and perform blind decoding on the first.

In operation 1306, the UE may obtain a second DCI from the second PDCCH.

According to the aforementioned third embodiment of the disclosure, the BS may transmit PDCCHs by applying an optimal size of a DFT precoder to transmit a PDCCH (corresponding to the second PDCCH), thereby maximizing PDCCH transmission coverage. Furthermore, the BS may directly notify the UE of an optimal size of a DFT precoder by L1 signaling, thereby solving the problem of increasing complexity from blind detection for the size of a DFT precoder that may occur in PDCCH blind decoding by the UE.

Figure 14:
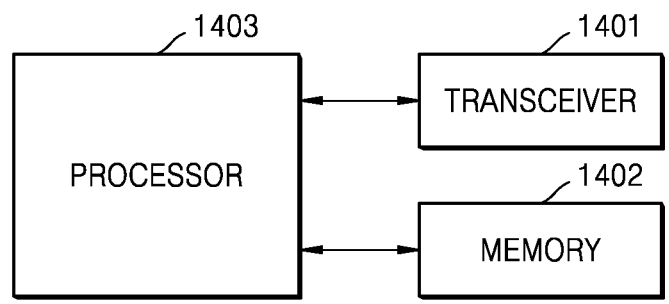
FIG. 14 is a block diagram illustrating a structure of a UE, according to an embodiment.
Figure 15:
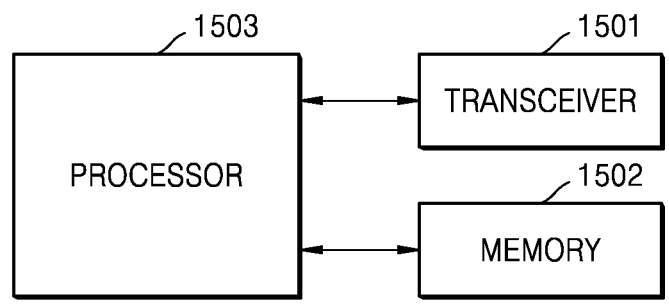
FIG. 15 is a block diagram illustrating a structure of a base station (BS), according to an embodiment.

Transceivers, memories, and processors of the UE and BS to implement the embodiments of the disclosure are shown in FIGS. 14 and 15. Transmission and reception methods by the BS and the UE for applying the DFT-S-OFDM based PDCCH transmission method in the above embodiments are described, and to perform the method, the transceivers, memories, and processors of the BS and the UE need to operate according to the embodiments.

FIG. 14 is a block diagram illustrating a structure of a UE, according to an embodiment. Referring to FIG. 14, a UE may include a transceiver 1401, a memory 1402, and a processor 1403. Components of the UE are not, however, limited thereto. For example, the UE may include more or fewer elements than described above. In addition, the transceiver 1401, the memory 1402, and the processor 1403 may be implemented in the form of a single chip.

In an embodiment, the transceiver 1401 may transmit or receive signals to or from a BS. The signals may include control information and data. For this, the transceiver 1401 may include an RF transmitter for up-converting the frequency of a signal to be transmitted and amplifying the signal and an RF receiver for low-noise amplifying a received signal and down-converting the frequency of the received signal. In addition, the transceiver 1401 may receive a signal on a wireless channel and output the signal to the processor 1403, or transmit a signal output from the processor 1403 on a wireless channel.

In an embodiment, the memory 1402 may store a program and data required for operation of the UE. Furthermore, the memory 1402 may store control information or data included in a signal transmitted or received by the UE. The memory 1402 may include a storage medium such as read only memory (ROM), random access memory (RAM), a hard disk, a compact disc ROM (CD-ROM), and a digital versatile disk (DVD), or a combination of storage mediums. Moreover, the memory 1402 may be plural. In an embodiment, the memory 1402 may store programs for a DFT-S-OFDM based PDCCH receiving operation, an inverse DFT precoding operation, blind decoding, etc., of the UE.

In an embodiment, the processor 1403 may control a series of processes for the UE to be operated according to the aforementioned embodiments of the disclosure. For example, the processor 1403 may control a DFT-S-OFDM based PDCCH receiving operation, an inverse DFT precoding operation, blind decoding, etc., of the UE differently according to embodiments of the disclosure. Furthermore, the processor 1403 may include a plurality of processors and control a DFT-S-OFDM based PDCCH receiving operation, an inverse DFT precoding operation, blind decoding, etc., of the UE differently according to embodiments of the disclosure by executing the programs stored in the memory 1402.

FIG. 15 is a block diagram illustrating a structure of a BS, according to an embodiment. Referring to FIG. 15, a BS may include a transceiver 1501, a memory 1502, and a processor 1503. Components of the BS are not, however, limited thereto. For example, the UE may include more or fewer elements than described above. In addition, the transceiver 1501, the memory 1502, and the processor 1503 may be implemented in the form of a single chip.

In an embodiment, the transceiver 1501 may transmit or receive signals to or from a UE. The signals may include control information and data. For this, the transceiver 1501 may include an RF transmitter for up-converting the frequency of a signal to be transmitted and amplifying the signal and an RF receiver for low-noise amplifying a received signal and down-converting the frequency of the received signal. In addition, the transceiver 1501 may receive a signal on a wireless channel and output the signal to the processor 1503, or transmit a signal output from the processor 1503 on a wireless channel.

In an embodiment, the memory 1502 may store a program and data required for operation of the UE. Furthermore, the memory 1502 may store control information or data included in a signal transmitted or received by the UE. The memory 1502 may include a storage medium such as ROM, RAM, a hard disk, a CD-ROM, and a DVD, or a combination of storage mediums. Moreover, the memory 1502 may be plural. In an embodiment, the memory 1502 may store programs for a DFT-S-OFDM based PDCCH transmitting operation or the like, of the BS.

In an embodiment, the processor 1503 may control a series of processes for the BS to be operated according to the aforementioned embodiments of the disclosure. For example, the processor 1503 may control a DFT-S-OFDM based PDCCH transmitting operation or the like, of the BS differently according to embodiments of the disclosure. Furthermore, the processor 1503 may include a plurality of processors and control a DFT-S-OFDM based PDCCH transmitting operation or the like, of the BS differently according to embodiments of the disclosure by executing the programs stored in the memory 1502.

Methods according to the claims of the disclosure or the embodiments described in the specification may be implemented in hardware, software, or a combination of hardware and software.

When implemented in software, a computer-readable storage medium storing one or more programs (software modules) may be provided. The one or more programs stored in the computer-readable storage medium are configured for execution by one or more processors in an electronic device. The one or more programs may include instructions that cause the electronic device to perform the methods in accordance with the claims of the disclosure or the embodiments described in the specification.

The programs (software modules, software) may be stored in RAM, a non-volatile memory including flash memory, ROM, electrically erasable programmable ROM (EEPROM), a magnetic disc storage device, a CD-ROM, a DVD or other types of optical storage devices, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a local area network (LAN), a wide LAN (WLAN), or a storage area network (SAN), or a combination thereof. The storage device may be connected to an apparatus for performing the embodiments of the disclosure through an external port. Furthermore, an extra storage device in the communication network may access a device that performs the embodiments of the disclosure.

In the embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

Several embodiments of the disclosure have been described, but a person of ordinary skill in the art will understand and appreciate that various modifications can be made without departing the scope of the disclosure. Thus, it will be apparent to those of ordinary skill in the art that the disclosure is not limited to the embodiments of the disclosure described, which have been provided only for illustrative purposes. Furthermore, the embodiments may be operated by being combined with one another if necessary.

The invention claimed is:

1. A method of receiving, by a user equipment (UE), physical downlink control channel (PDCCH) in a wireless communication system, the method comprising:
   receiving, from a base station (BS), a configuration of a control resource set (CORESET) including information of a CORESET identifier, information of a number of the CORESET and information related to discrete Fourier transform spreading orthogonal frequency division multiplexing (DFT-S-OFDM) via higher layer signaling; and
   receiving the PDCCH based on the configuration of the CORESET;

wherein a size of DFT for the DFT-S-OFDM is determined based on the number of the CORESET.

2. The method of claim 1, wherein downlink control information (DCI) included in the received PDCCH comprises information related to the size of DFT applied to the PDCCH.

3. The method of claim 1, further comprising: receiving, from the BS, a plurality of candidate values indicating sizes of DFT precoding applied to the PDCCH via higher layer signaling,
wherein the information related to the size of DFT indicates one of the plurality of candidate values as a value indicating the size of DFT precoding applied to the PDCCH.

4. The method of claim 1,
wherein the higher layer signaling includes at least one of master information block (MIB), system information block (SIB), or radio resource control (RRC) signaling.

5. A method of transmitting, by a base station (BS), physical downlink control channel (PDCCH) in a wireless communication system, the method comprising:
transmitting, to a user equipment (UE), a configuration of a control resource set (CORESET) including information of a CORESET identifier, information of a number of the CORESET and information related to discrete Fourier transform spreading orthogonal frequency division multiplexing (DFT-S-OFDM) via higher layer signaling,
wherein a size of DFT for the DFT-S-OFDM is determined based on the number of the CORESET.

6. The method of claim 5, wherein downlink control information (DCI) included in the received PDCCH comprises information related to the size of DFT applied to the.

7. The method of claim 5, further comprising: transmitting, to the UE, a plurality of candidate values indicating sizes of DFT precoding applied to the PDCCH via higher layer signaling,
wherein the information related to the size of DFT indicates one of the plurality of candidate values as a value indicating the size of DFT precoding applied to the PDCCH.

8. The method of claim 5,
wherein the higher layer signaling includes at least one of master information block (MIB), system information block (SIB), or radio resource control (RRC) signaling.

9. A user equipment (UE) for receiving physical downlink control channel (PDCCH), the UE comprising:
a transceiver; and
at least one processor coupled to the transceiver and configured to:
receive, from a base station (BS), a configuration of a control resource set (CORESET) including information of a CORESET identifier, information of a number of the CORESET and information related to discrete Fourier transform spreading orthogonal frequency division multiplexing (DFT-S-OFDM) via higher layer signaling, and
receive the PDCCH based on the configuration of the CORESET,
wherein a size of DFT for the DFT-S-OFDM is determined based on the number of the CORESET.

10. A base station (BS) for transmitting physical downlink control channel (PDCCH), the BS comprising:
a transceiver; and
at least one processor coupled to the transceiver and configured to:
transmit, to the UE, a configuration of a control resource set (CORESET) including information of a CORESET identifier, information of a number of the CORESET and information related to discrete Fourier transform spreading orthogonal frequency division multiplexing (DFT-S-OFDM) via higher layer signaling, and
transmit the PDCCH based on the configuration of the CORESET,
wherein a size of DFT for the DFT-S-OFDM is determined based on the number of the CORESET.

* * * * *